Oct. 9, 1923.                J. W. DAVISON                1,469,931
                                 LENS
                           Filed Nov. 5, 1920
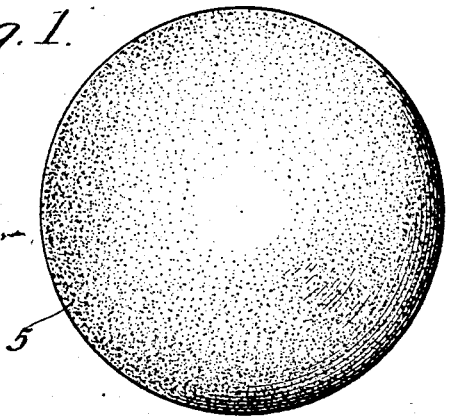
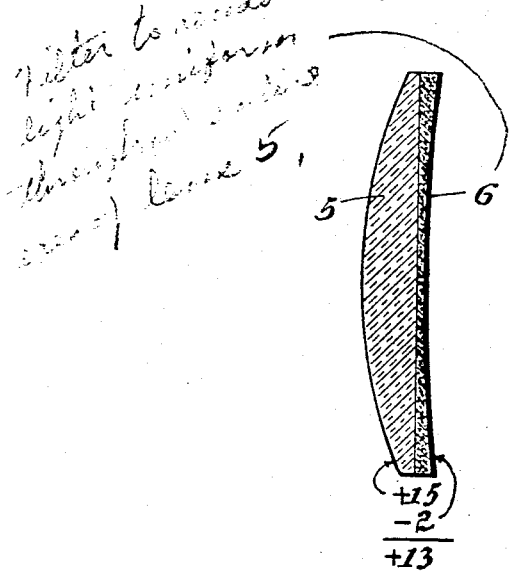
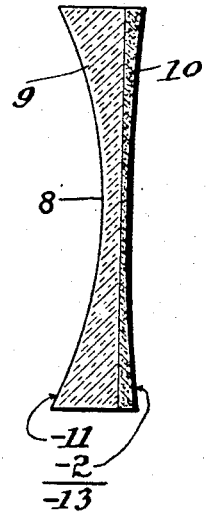
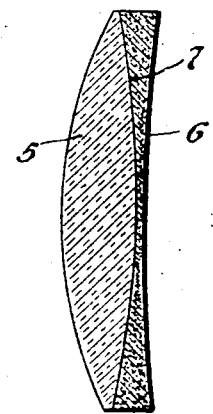
Inventor:
John W. Davison
By
Benjamin, Roosharse & Lundy Attys.

Patented Oct. 9, 1923.

1,469,931

UNITED STATES PATENT OFFICE.

JOHN W. DAVISON, OF MATTOON, ILLINOIS.

LENS.

Application filed November 5, 1920. Serial No. 421,940.

*To all whom it may concern:*

Be it known that I, JOHN W. DAVISON, a citizen of the United States, residing at Mattoon, in the county of Coles and State of Illinois, have invented a new and useful Improvement in Lenses, of which the following is a specification.

My present invention relates to improvements in lenses. In lenses of all characters, whether for ophthalmic or other uses, the central area surrounding the optical axis is relatively free from aberration, this phenomenon being largely introduced by the refraction of light through what may be styled the peripheral areas of the lens. While the light refracted through the peripheral areas of the lens is not as perfectly focused, it is quite as strong, and generally much stronger, than the light received through the center of the lens both on account of the greater extent of the peripheral areas, and, in positive or convex lenses, because the peripheral areas are thinner than the central portion and the absorption of light by the glass is not as great.

There are many situations in which it is desirable to reduce the relatively imperfectly refracted illumination received through the peripheral areas of a lens. Especially is this true in ophthalmic lenses of extreme curvature for patients who have been operated for cataract and have had the crystalline lens of the eye removed, for in such cases the eye lacks the normal protection against an undue illumination. This is also to a greater or less extent true with all patients whose eyes are unusually sensitive and easily irritated, depending, of course, upon the degree of sensitiveness which has to be provided for in any particular case.

Also in making lenses other than plano, that is lenses in which the front and back surfaces are not parallel, from a colored glass of such composition as to act as a ray filter to remove the irritating ultra-violet rays, the central portion of positive lenses, by reason of their greater thickness, have heretofore always been a deeper shade than the peripheral portions. Such a condition is the direct reverse of what is desired, as it reduces the illumination through the best refracting and most used portion of the lens while permitting a relatively greater illumination through the little used and more imperfectly acting peripheral portions. It will also be appreciated that my invention may be utilized with advantage in the construction of negative or concave lenses to control the degree and disposition of the shading, as concave lenses of colored glass of extreme or even moderate curvatures will be darker than is generally desirable in the peripheral areas. This difficulty has heretofore been of such a serious nature as to prohibit the employment of such glass in lenses of a heavy or even moderate curvature, and to seriously militate against the use of such glass in all lenses different areas of which vary in thickness.

My present invention has for its object the provision of lenses which are shaded with a color or shading of a light filtering quality or otherwise which is greatest or deepest at the edges of the lens and gradually diminishes toward the center. This shading may be of either a degree or character to produce a uniform illumination from all areas of the lens, or to relatively decrease the illumination from the peripheral areas as may be desired under different classes of conditions.

I prefer to attain the above mentioned object in the manner hereinafter described, and by means of the arrangement of optical elements, as shown in the accompanying drawings, in which—

Figure 1 is a front view of a lens in which the stippling indicates a shading or coloring so as to reduce the illumination received from the peripheral areas relative to that received from the central area.

Figure 2 is a central section of a positive lens showing the scheme of arrangement of lens elements for securing the desired shading.

Figure 3 is a central section of a positive lens showing the same scheme of arrangement of lens element as is shown in Figure 2, but employing different shapes of lens elements; and Figure 4 is a central section of a negative lens constructed in accordance with my invention.

The views are to a somewhat exaggerated scale, and of a schematic nature for better illustrating the invention. Similar reference characters refer to similar parts in the respective views.

My invention involves the employment of a lens element of clear glass having the desired kind of curvature, either positive or negative, with which is combined a negative lens element, of a desired shade or density of color, with a strength of curvature the algebraic sum of which with the curvature of the clear lens element will be the curvature sought or required for the complete lens.

It will be assumed that a complete positive lens of thirteen dioptres is required. A clear lens element, as indicated by the reference numeral 5 in Figure 2 is taken, having a curvature which will produce a refraction in excess of thirteen dioptres, say fifteen dioptres. This lens element has been shown of plano-convex form. With the lens element 5 is combined a plano-concave lens element 6 of light modifying qualities having a negative refracting strength of two dioptres, the algebraic sum of the strengths of which two elements will be the required positive thirteen dioptres.

In Figure 2 the adjacent faces of the lens elements 5 and 6 are shown of plano form which is convenient when it is desired to cement these elements together. The plano form of the adjacent faces of the respective lens elements is not essential, however, as all that is required is that the adjacent faces of the respective elements shall sufficiently neutralize each other so that the algebraic sum of the entire strengths of the respective elements shall be of the required nature and strength. In Figure 3, I have shown the adjacent faces of the respective elements curved, as at 7. Numerous combinations of different strengths of the respective elements may be employed, the principle of choice being to obtain a negative element of a thickness and curvature which will produce the depth and gradation of color desired.

When a complete lens of a negative character is required, say of thirteen dioptres strength, a clear glass lens element is taken, one face 8 whereof has a concave or negative curvature of a strength, say of eleven dioptres, or of somewhat less than the total final strength required. Such an element is designated by the reference numeral 9 in Figure 4. With element 9 is combined a negative lens element 10 of colored glass of a strength the algebraic sum of which with the strength of element 9 will be the strength required. In Figure 4, the elements 9 and 10 have been shown with opposing or adjacent plano surfaces, with which forms in the instance assumed the negative curvature of the element 10 would be of a strength of two dioptres.

The same considerations prevail in determining the relative strength of the lens elements in forming a negative combination as govern the determination of the relative strength of the elements for a positive combination.

It will now be seen from the foregoing description taken in connection with the drawing, that I have provided a lens of positive form and converging or condensing properties which may be made so as to transmit illumination either uniformly through its central and peripheral areas or which will modify the light transmitted gradually from the periphery to the center of the lens so as to lessen the intensity of the illumination transmitted through the peripheral areas while leaving the central area relatively clear and unobstructed. It will also be seen that I have disclosed a manner of constructing lenses of either positive or a negative character in which light modifying qualities may be controlled and distributed throughout the various areas of the lenses.

Having described my invention, what I claim as new and desire to secure by Letters Patent is:

1. A lens comprising a plurality of co-extensive elements of light refracting properties, one of which elements is of light filtering material and has a surface of negative curvature, the algebraic sum of the curvatures of said lens elements being equal to the curvature for securing the desired refraction.

2. A lens comprising a plurality of co-extensive elements each having a curved surface, one of which elements is of light filtering material and has a surface of concave or negative curvature of a radius to secure the desired progressive light filtering power from the center to the edges thereof, the algebraic sum of the curvatures of said lens elements being equal to the curvature for securing the desired refraction.

Signed at Chicago, county of Cook and State of Illinois, this 29th day of October, 1920.

JOHN W. DAVISON.